United States Patent [19]

Jensen et al.

[11] 3,855,595

[45] Dec. 17, 1974

[54] FREQUENCY SPECTRUM DISPLAY FOR RADAR

[75] Inventors: Garold K. Jensen, Alexandria, Va.; James E. McGeogh, Silver Spring, Md.

[73] Assignee: The United States of America as represented by the Secretary of the Navy, Washington, D.C.

[22] Filed: June 16, 1971

[21] Appl. No.: 154,232

[52] U.S. Cl. .................................. 343/8, 343/5 SA
[51] Int. Cl. .............................................. G01s 9/44
[58] Field of Search .............................. 343/5 SA, 8

[56] References Cited
UNITED STATES PATENTS
2,905,894  9/1959  Rudmann, Jr. ............. 343/59 A X
3,119,999  1/1964  Jaffe ........................... 343/5 SA X
3,711,822  1/1973  Muller ............................. 343/8 X
3,715,509  2/1973  Dawson ...................... 343/5 SA X Primary Examiner—T. H. Tubbesing
Attorney, Agent, or Firm—R. S. Sciascia; Arthur L. Branning

[57] ABSTRACT

Means providing a display of the doppler frequency spectrum of a target return in an O-T-H radar, said spectrum display means comprising a velocity strobe circuit providing a pulse adjustable in time and width which can be made to coincide with any target displayed on any of the velocity-displaying scopes of the radar and a highspeed horizontal sweep generator for displaying only the target with which the strobe pulse has been made to coincide.

Camera means to record the display may also be provided.

4 Claims, 5 Drawing Figures

SOLENOID ENERGIZED:
SHUTTER OPEN

INVENTORS
GAROLD K. JENSEN
JAMES E. McGEOGH

ATTORNEYS

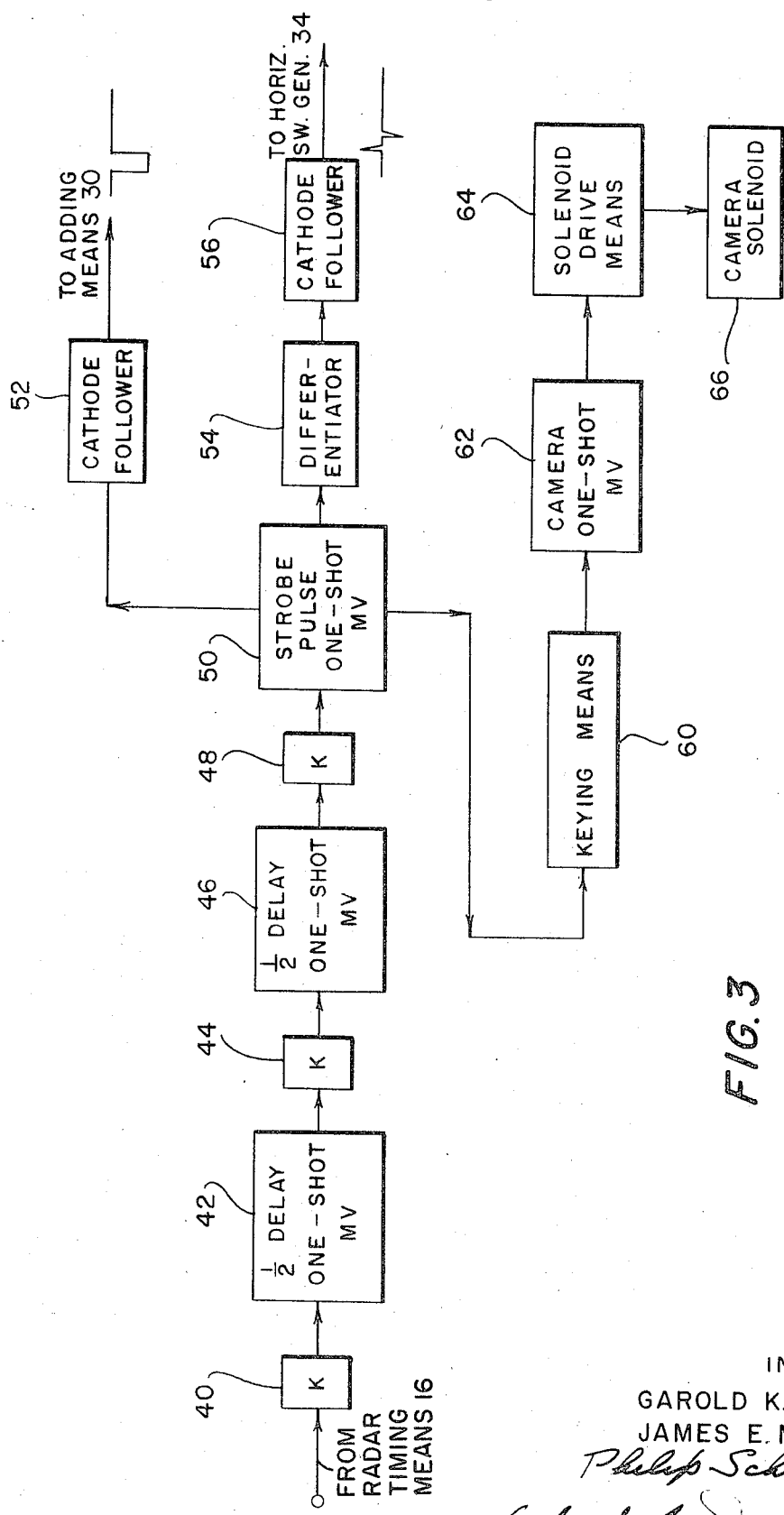

FREQUENCY SPECTRUM DISPLAY FOR RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a spectrum display for the doppler frequency characteristic of moving targets.

In an O-T-H (over-the-horizon) radar of the type described in copending U.S. Patent applications, Ser. Nos. 649,791 and, filed 6/27/67, and 285,555, filed 5/31/63, information is obtained on target range, velocity and acceleration. Various displays are employed such as range-time, velocity-time, acceleration-time, acceleration-range, acceleration-velocity, velocity-range. To obtain information as to whether the radar is successfully performing its integration of return signals, a display of the doppler frequency spectrum of any selected target would be useful.

BRIEF SUMMARY OF INVENTION

Accordingly, the invention permits the doppler frequency spectrum of a selected target to be displayed on a separate CRT. The invention comprises a velocity strobe means which generates a pulse which can be adjusted in time and in pulse width. When applied to one of the velocity display scopes, such as velocitytime, the strobe pulse provides a line on the scope which can be made to coincide with a selected target. This target is then displayed on the spectrum display CRT since the velocity strobe signal is used to initiate a fast sweep signal which encompasses the target.

OBJECTS OF THE INVENTION

An object of the invention is to display the doppler frequency spectrum of selected target returns in an O-T-H radar having velocity-and-acceleration parameter analyzing capability.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a block diagram showing the invention in more detail;

DETAILED DESCRIPTION OF THE INVENTION

Figure 1:
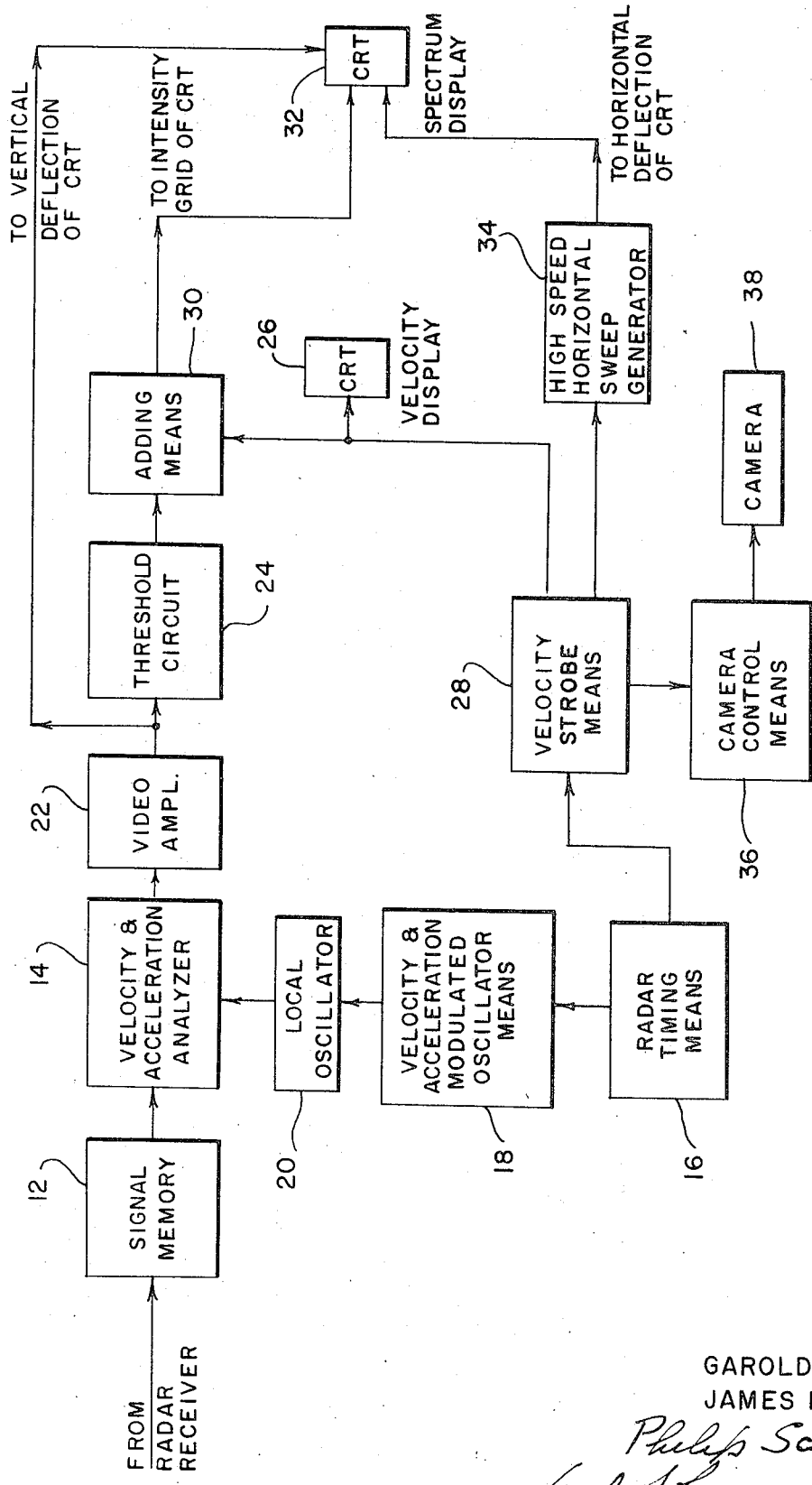
FIG. 1 is a block diagram of the invention in the radar apparatus in which it is used.

FIG. 1 shows the invention in block form in conjunction with circuits used in an O-T-H radar which matches return signals with respect to their velocity and acceleration characteristics. Components of the O-T-H radar comprise the signal memory 12, velocity-and-acceleration analyzer 14, radar timing means 16, velocity-and-acceleration modulated oscillator means 18, local oscillator 20, video amplifier 22, threshold circuit 24 and velocity display CRT 26. The latter can be any display of the velocity parameter, such as the velocity-time display.

The velocity strobe means 28 is an adjustable pulse generator triggered by the timing pulse from the radar timing means 16. The velocity strobe pulse is a pulse which is adjustable in time and in pulse width. It is fed to one of the velocity display scopes 26 where it appears as a straight line whose position and width can be adjusted. The line is moved to coincide with a selected target return on the scope and this is the target whose spectral characteristics will be displayed. The length of the strobe pulse line is adjusted to overlap the target return on both ends.

Figure 2:
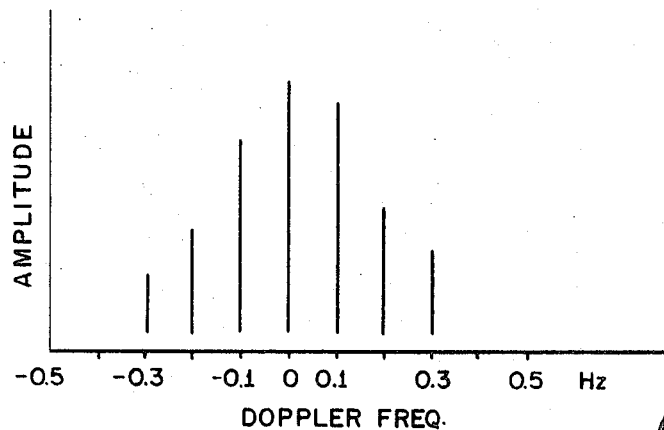
FIG. 2 is an illustration of the doppler frequency spectrum display.

The velocity strobe pulse is differentiated and fed to the high-speed horizontal sweep generator which provides a short sweep voltage to the horizontal deflection means of a spectrum display CRT 32. The signal to the vertical deflection means is the signal output of the video amplifier. The velocity strobe pulse is also fed to adding means 30 where it is combined with the thresholded video signal and then fed to the intensity grid of the spectrum display CRT 32. This provides a display of the doppler frequency spectrum of the selected target return, as shown in FIG. 2. The doppler frequency band may be divided into units of 0.1 Hz, for example.

Figure 4:
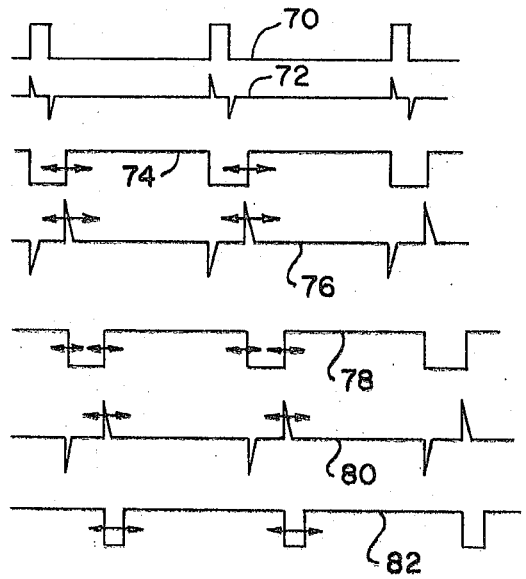
FIG. 4 is a diagram showing the waveforms produced by the velocity strobe means.

The velocity strobe means 28 and camera control means 36 are shown in more detail in FIG. 3. The timing pulse (waveform 70, FIG. 4) from the radar timing means 16 is fed to a keying means 40 which is an isolating circuit for the multivibrator 42. A differentiator is also provided in each keying means to differentiate the pulse (waveform 72).

The differentiated timing pulse is applied to a ½-delay one-shot multivibrator 42, whose output pulse is a rectangular wave with an adjustable trailing edge (waveform 74). This output pulse is differentiated in keying means 44 which provides differentiated pulses (waveform 76) at the leading and trailing edges of the rectangular pulses of the multivibrator 42.

The differentiated pulse is applied to ½-delay one-shot multivibrator 46, whose output pulse now has adjustable leading and trailing edges (waveform 78). The output of the multivibrator 46 is passed through keying means 48 which differentiates it (waveform 80). The trailing-edge spike is used to trigger the production of a pulse from the strobe pulse one-shot multivibrator 50 (waveform 82), both edges of which are adjustable in time.

Figure 5:
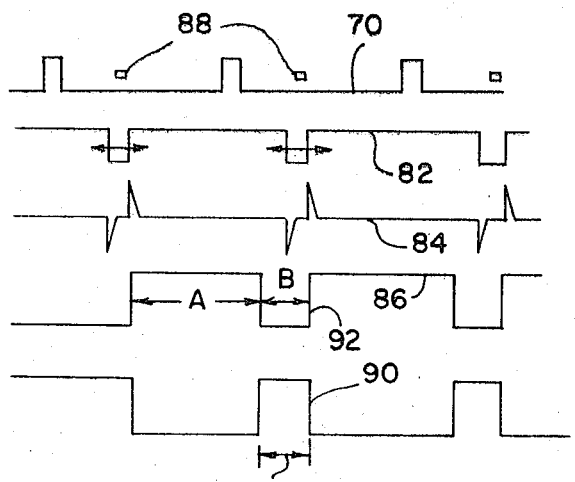
FIG. 5 is a diagram showing the waveforms produced by the camera control means.

The output of the strobe pulse multivibrator 50 is fed through a cathode follower 52 to the adding means 30; it is also fed through a differentiator 54 and cathode follower 56 to the horizontal sweep generator 34 to initiate the sweep voltage; and it is fed through a keying means 60 to the camera one-shot multivibrator 62 (waveform 86, FIG. 5). As can be seen, the strobe pulse 82 is centered on and overlaps the target return 88 which is not part of the radar timing pulse train but is shown in conjunction with this waveform to indicate its time of occurrence with respect to the waveforms. The trailing edge of the differentiated output (waveform 84) of the keying means 60 initiates the pulse (waveform 86) produced by the camera multivibrator 62. This pulse is then inverted (waveform 90) and is used to produce a current output from the solenoid drive means 64 which energizes the camera solenoid 66 during period B. Energization of the solenoid opens the camera shutter and permits a photograph of the spectrum display to be made.

The trailing edge 92 of the pulse (waveform 86) from the camera multivibrator 62 occurs at a time which permits the camera solenoid to advance the camera by one frame. The solenoid is spring-operated and advances the camera when it is deenergized and the spring operates to push it back to the shutter-closed position.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a velocity-and-acceleration analyzing radar including means for displaying the velocity parameter of target-return signals, radar timing means, a velocity-and-acceleration analyzer, a video amplifier and a threshold circuit, means for displaying the doppler frequency spectrum of a selected signal comprising:

velocity strobe means triggered by the radar timing means output signal for producing a pulse output which is adjustable as to time of occurrence with respect to the trigger pulse, the stobe pulse also being fed to said means for displaying the velocity parameter so that a particular target may be selected by adjusting the position of the pulse indication to coincide with the target-return indication;

means for generating a high-speed sweep signal, said sweep means being connected to be triggered by the output from said velocity strobe means;

adding means for adding its input signals, said adding means being connected to receive as input signals the thresholded video signal output of said threshold means and the strobe pulse from said velocity strobe means; and cathode ray tube means (CRT) for displaying the doppler frequency spectrum of said selected target return, said CRT means having the output of said high-speed sweep means connected to its horizontal deflection means, the output of said video amplifier connected to its vertical deflection means and the output of said adding means connected to its beam intensification means.

2. Apparatus as in claim 1, wherein said velocity strobe means includes means for adjusting both edges of its output pulse in time so that the pulse width may be varied.

3. Apparatus as in claim 1, further including means for photographing said doppler-frequency-spectrum display comprising:

camera means having a biased solenoid and shutter means, said solenoid operating to open said shutter means when energized and to close said shutter means when deenergized, and camera control means connected to receive the velocity strobe pulse as an input for energizing said solenoid during the period of occurrence of said velocity strobe pulse.

4. Apparatus as in claim 2, wherein said velocity strobe means comprises:

first keying means connected to receive the radar timing signal as an input, said keying means acting as an isolating and differentiating circuit;

first delay means connected to receive the output of said first keying means as an input for producing a pulse therefrom having an adjustable trailing edge;

second keying means connected to receive the output of said first delay means as an input, said keying means acting as an isolating and differentiating circuit;

second delay means connected to receive the output of said second keying means as an input, for producing a pulse from the trailing spike of said input whereby both edges of the output of said second delay means are adjustable as to time of occurrence;

third keying means connected to receive the output of said second delay means as an input, said keying means acting as an isolating and differentiating circuit; and strobe pulse means connected to receive the output of said third keying means as an input for producing a pulse from the trailing spike thereof, said pulse being adjustable as to time of occurrence and as to pulse width.

* * * * *